(12) United States Patent
Huang et al.

(10) Patent No.: US 6,973,223 B2
(45) Date of Patent: Dec. 6, 2005

(54) DEVICE FOR PROVIDING POLARIZED LIGHT

(75) Inventors: Wei-Ping Huang, Spanga (SE); Tomas Adeback, Järfälla (SE); Jan Magnusson, Taby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 10/362,414

(22) PCT Filed: Sep. 10, 2001

(86) PCT No.: PCT/SE01/01931

§ 371 (c)(1),
(2), (4) Date: Apr. 25, 2003

(87) PCT Pub. No.: WO02/23260

PCT Pub. Date: Mar. 21, 2002

(65) Prior Publication Data

US 2003/0165283 A1     Sep. 4, 2003

(30) Foreign Application Priority Data

Sep. 11, 2000   (SE) .................................. 0003208

(51) Int. Cl.[7] .............................. G02B 6/00; G02B 6/27
(52) U.S. Cl. ..................... 385/11; 385/15; 250/227.17; 250/227.27
(58) Field of Search ............... 385/11–13; 250/227.17, 250/227.27

(56) References Cited

U.S. PATENT DOCUMENTS

| | | |
|---|---|---|
| 4,389,090 A | 6/1983 | LeFevre |
| 4,793,678 A | 12/1988 | Matsumoto et al. |
| 5,216,733 A | 6/1993 | Nagase et al. |
| 5,561,726 A | 10/1996 | Yao |
| 5,766,300 A | 6/1998 | Hulten et al. |
| 5,780,647 A * | 7/1998 | Dawson et al. ........ 250/227.17 |
| 5,894,531 A * | 4/1999 | Alcoz ......................... 385/11 |
| 6,049,415 A * | 4/2000 | Grubb et al. ............ 359/341.1 |
| 6,166,816 A * | 12/2000 | Blake ........................ 356/478 |

FOREIGN PATENT DOCUMENTS

| | | |
|---|---|---|
| EP | 0 427 705 | 5/1991 |
| EP | 0751410 A2 | 1/1997 |
| WO | WO98/53352 | 11/1998 |
| WO | WO 00/49438 | 8/2000 |

OTHER PUBLICATIONS

Swedish Patent Application No. 9300522-1, "Alignment and Connection of Optical PM-Fibres," filed Jan. 17, 1993, Abstract.

(Continued)

*Primary Examiner*—John R. Lee
*Assistant Examiner*—Paul M. Gurzo
(74) *Attorney, Agent, or Firm*—Nixon & Vanderhye P.C.

(57) ABSTRACT

In a device (100) for continuously varying the extinction ratio, ER, a laser diode (102) is connected to a first end of a PZ fiber (108). At a second end, the PZ fiber is connected to a connector (110). At the other end of the connector a PM fiber (106) is connected. The two fibers meet in the connector, which means that opposite end facets of the fibers are located at a very close distance of each other. A rotation is produced by a rotator (104), mechanically coupled to the connector. The device can be used for: selecting a desired ER of the PM fiber; achieving high accuracy of angular alignment between the principal axes of two PM fibers (106, 506); evaluating the quality of angular alignment of a splice between two PM fibers made by a splicer; and setting the adjustment/calibration of a PM fiber.

17 Claims, 3 Drawing Sheets

OTHER PUBLICATIONS

Wenxin Zheng, "Automated Fusion-Splicing of Polarization Maintaining Fibers," Journal of Lightwave Technology, vol. 15, No. 1, Jan. 1997.

Sidney L.A. Carrara, Birefringent-Fiber Splice Alignment, SPIE vol. 1267 Fiber Optic Sensors IV (1990).

Haruhito Shimizu, Shuntaro Yamazaki, Takashi Ono, and Katsümi Emura, "Highly Practical Fiber Squeezer Polarization Controller," Journal of Lightwave Technology, vol. 9, No. 10, Oct. 1991.

Donald K. Wilson, "Polarization Control Aids Fiber Component Testing," Laser Focus World, Jan. 1997.

* cited by examiner

DEVICE FOR PROVIDING POLARIZED LIGHT

This application is the US national phase of international application PCT/SE01/01931 filed 10 Sep. 2001 which designated the U.S. and claims the priority benefit of Swedish priority application number 0003208.6, filed Sep. 11, 2000, the entire contents of both applications are hereby incorporated by reference.

TECHNICAL FIELD

The present invention relates to a fiber optical polarizing device, more particularly to a device and method for providing polarized light with a selectable extinction ratio, ER, as well as a method for assembling such a device.

BACKGROUND OF THE INVENTION

The extinction ratio, ER, is an important characteristic of light polarization maintaining (PM) fibers and similar devices. The extinction ratio can be described as the ratio of the optical power of a plane-polarized beam transmitted through a polarizer which is placed in the path of the beam with the polarizing axis parallel to plane of the beam, as compared to the transmitted optical power when the axis of the polarizer is perpendicular to the plane of the beam.

When polarized light having an initial ER propagates along a polarization maintaining optical waveguide the ER of the light will be gradually reduced. In particular, polarized light propagating through a splice of two PM fibers will experience a degradation of the ER. This ER degradation is often used as a measure of the quality of splices of PM fibers.

Polarized light having well defined ERs can thus be used in determining the quality of PM fiber splices by injecting the polarized light to pass the splice and measuring the ER of the light after the splice. Measurements for polarized light of different ERs or for a carefully selected ER can give an accurate measured value of the quality of a splice. Polarized light having well defined ERs can also be used in exploring various polarization properties of PM fibers, e.g. polarization dependent losses, polarization mode dispersion, etc. Therefore, a device for providing polarized light having an ER, which can be easily set to a desired value, is valuable in measurement systems for evaluating PM fibers and splices thereof.

In a conventional measurement system for determining properties of splices of PM fibers several distinct optical components, e.g. optical lenses, polarizers, wave-plates etc., which can have rather large dimensions, are needed to produce polarized light of a desired extinction ratio and to couple it into the optical PM fibers. Such a system is generally sensitive to environmental changes, such as vibration, temperature, and it requires a tedious and time-consuming adjustment. Therefore, the field applications of such systems remain limited.

A device for providing polarized light can comprise a fiber squeezer, as described by H. Shimizu, S. Yamazaki, T. Ono and K. Emura in "Highly Practical Fiber Squeezer Polarization Controller", J. Lightwave Technol, Vol. 9, No. 10, pp. 1217–1224, October 1991.

A different kind of fiber squeezer is described by Yao et al. in U.S. Pat. No. 5,561,726 having the title "Apparatus and method for connecting polarization sensitive devices". According to this patent an optical fiber is used a center portion of which is placed in a rotatable fiber squeezer and is squeezed to produce a birefringent medium having a birefringent axis in the direction of a squeezing pressure. The magnitude of the birefringence is controlled by the amount of pressure imposed by the fiber squeezer on the center portion of the fiber.

Another prior art device for influencing the state of light polarization is disclosed by D. Wilson in "Polarization Control Aids Fiber Component Testing" in Laser Focus World, pp. 129–133, January 1997. The device is like those described above based on birefringence induced by stress on the fiber to achieve a transformation of polarization. The major disadvantage of these devices using stress induced changes in a polarization state controller is, however, the high mechanical stress on the fiber that may significantly reduce the lifetime of the fiber used.

A prior art device for providing polarized light is disclosed by Kim et al. in the published International patent application WO 98/53352 having the title "The optical fiber polarization controller". This prior art optical fiber polarization controller has a compact size as it employs wave plates made of short sections, slices, of a birefringent optical fiber. The optical fiber polarization controller controls the polarization state of input light by twisting or rotating the birefringent slices that are connected to conventional single-mode fibers.

Another prior art device for controlling the light polarization state in an optical fiber is disclosed by Engquist in Swedish patent 503 257 having the title "Metod och anordning vid optisk fiber" ("A method and device including an optical fiber"). This prior art device comprises a couple of rotating objects that each one, controls a specific polarization direction. Each object comprises two bases at either sides of a rotatable cylindrical object. The fiber is wound around the rotating cylindrical object so that the object can independently rotate along the light propagation axis.

A prior art device for controlling the state of polarization of light is disclosed by LeFevre in U.S. Pat. No. 4,389,090 having the title "Fiber optic polarization controller". This prior art device comprises a strand of optical fiber material, which is bent into a generally planar coil of a relatively small radius. The fiber strand is stressed and forms a birefringent medium having its principal axis rotated in order to control the polarization of light passing through the strand. In a second embodiment, one portion of the fiber strand is twisted about its axis to change the polarization, and a second portion of the strand is formed into a coil that is free to change its radius without any additional twisting when the first portion is twisted.

A prior art device for controlling the polarization direction of light propagating through an optical fiber is described in U.S. Pat. No. 4,793,678 having the title "Fiber optic polarization controller" for Matsumoto et al. The control of the polarization is done by bending a single-mode fiber within an imaginary plane to generate a birefringence in the fiber, and by rotating the plane defined by the bent fiber portion. The optical fiber may be rotated either by utilizing the stability of the fiber, which is held loosely at the curved portion, or by forcibly rotating the curved portion from the outside.

A prior way of connecting fibers using a coupling device is described by Stone in European patent application EP 0 751 410 having the title "Optical fiber having polarizer with reduced optical loss". A special optical coupling device comprises a dichroic glass polarizer that optically couples a first end face of a first optical fiber to a second end face of a second optical fiber. An optically transparent adhesive may fix the glass polarizer to the optical fiber. It is relatively complicated to splice two optical fibers by using this dichroic coupling medium, as described above.

DESCRIPTION OF THE INVENTION

It is an object of the present invention to provide a device and method for control of the polarization of light in an optical fiber at the time of evaluation of a polarization property of a PM fiber, avoiding at least some of the drawbacks of the prior art.

This is accomplished in the device for providing polarized light having a selectable extinction ratio according to claim 1, by the method for assembling the device according to claim 11; and by the method for producing polarized light having a selectable extinction ratio according to claim 12.

A problem that is solved by this invention is how to obtain a device for PM fiber splicing systems without introducing additional optical components other than optical fibers.

Thus generally, in a device for providing polarized light of a desired polarization state, light e.g. obtained from a semiconductor laser diode is fed to a piece of polarizing (PZ) optical fiber. The PZ fiber works as a polarizer providing at its output end highly polarized light. The PZ fiber is coupled to an optical fiber adapter. Inside the adapter, the PZ fiber is optically coupled to a polarization maintaining (PM) fiber. The PM fiber is attached to a rotator so that the PM fiber can be rotated in relation to the PZ fiber changing the azimuthal or angular offset between optical principal axes of the PZ fiber and the PM fiber. Thereby, the extinction ratio of light at the free end of the PM fiber can be continuously varied.

The device utilizes the properties of special optical fibers to control a change of the polarization state without having to use optical components other than the fibers.

The device can be used for active angular alignment of and/or for performing ER measurements on PM fibers to be/being spliced, for monitoring the process of angular alignment and for evaluating a PM fiber splice. The device is not sensitive to environmental changes and no extensive adjustment of the device is needed. The typical time for assembling the device and starting measurements comprises only a few minutes, depending mainly on the time required for preparation of the fibers to be used.

Thus, one advantage of the present invention is that the device can be used in the field without any extensive adjustment and that the time for initiating measurements, including fiber preparation and system calibration is much shorter than in prior art devices.

BRIEF DESCRIPTION OF THE DRAWINGS

The invention will now be described by way of non-limiting embodiments with reference to the accompanying drawings, in which.

DESCRIPTION OF PREFERRED EMBODIMENTS

Figure 1:
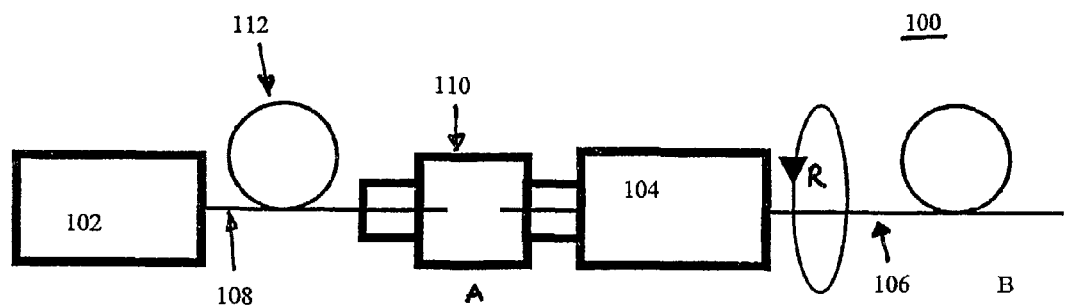
FIG. 1 is a schematic view of an ER controller.

FIG. 1 is a schematic view of a device 100 for generating polarized light, the extinction ratio (ER) of which can be continuously varied. The device 100 comprises a laser diode 102, a polarizing (PZ) fiber 108, a fiber connector 110, a polarizing maintaining (PM) fiber 106 and a rotator 104. The laser diode 102 comprises a pigtail fiber connected to a first end facet of the PZ fiber 108. The PZ fiber 108 can typically be about 5 meters long and is wound around a mandrel 112 that e.g. has a diameter of three inches. At the second, opposite end facet of the PZ fiber 108, the PZ fiber is secured to one end of the connector 110. The PM fiber 106 is at a first end attached to the other end of the connector 110. The end regions of the two fibers 108, 106 held by the connector 110 have their fiber axes or geometrical longitudinal axes aligned with each other by the connector. This transverse alignment can e.g. be achieved by V-grooves in the connector 110. The ends of the two fibers thus meet in the connector 110, which means that the opposite end facets of the fiber end regions are located opposite and at each other, at a very small distance of each other. Thereby polarized light propagating in the PZ fiber 108 is coupled from the PZ fiber into the PM fiber 106. The end facets of the fibers 108, 106 are not spliced or mechanically joined to each other, hence allowing azimuthal displacement, i.e. rotation of the two fiber ends in relation to one another, about the longitudinal axis of the meeting fiber end regions. Thus, a relative rotation of the fiber ends can be made while constantly maintaining an optical coupling between the close end facets of the two fibers. The rotation is produced by the rotator 104, which is mechanically coupled to the connector 110. The PM fiber 106 is preferably connected to the rotator 104, whereas the PZ fiber 108 is held fixed.

The PZ fiber 108 could possibly be rotated instead of the PM fiber 106. This would mean that the PZ fiber 108 is connected to the rotator 104 and that the PM fiber 106 is fixed. Another possibility could be that both the PM fiber 106 and PZ fiber 108 are connected in such a way that they both can rotate.

Figures 2, 3:
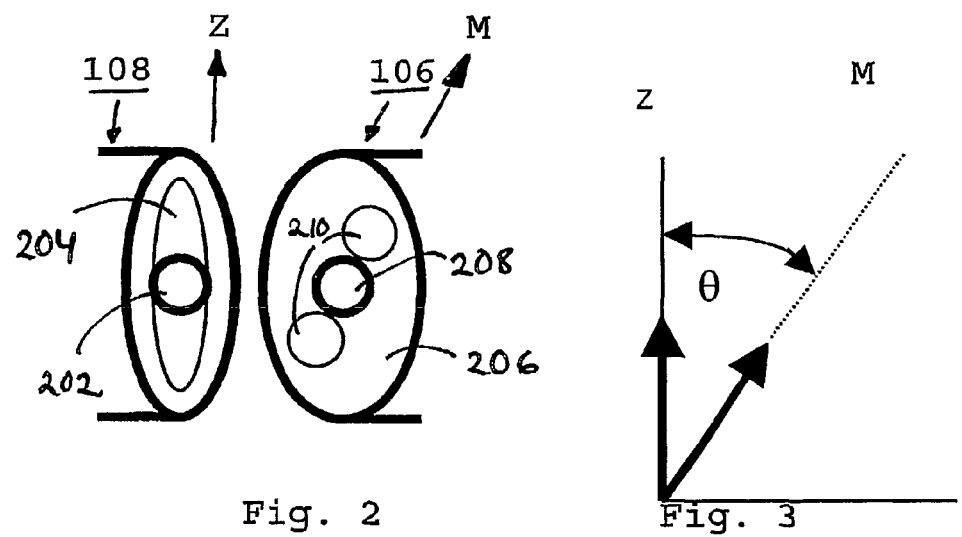
FIG. 2 is a schematic view showing end surfaces of a PZ fiber and a PM fiber.
FIG. 3 is a diagram showing the angular offset θ between the principal axes of a PZ fiber and a PM fiber.

The PZ fiber 108 is a special kind of PM fiber. A PZ fiber 108, see FIG. 2, is typically designed by creating an elliptically shaped stress jacket 204 around a fiber core 202. The two optical axes of the PZ fiber 108 have different cut-off wavelengths for light propagating in its fundamental modes, the cut-off wavelength of the fast axis being shorter than that of the slow axis. Light having wavelengths between the two cut-off wavelengths will practically only propagate along the slow axis, because the component polarized along the fast axis will be strongly attenuated. Typically, the light intensity along the fast axis will be decreased by four orders of magnitude after propagating a few meters in the PZ fiber 108. The polarized light propagating along the slow axis, the principal axis Z, is only very little attenuated.

A common type of PM fiber 106, e.g. a Panda fiber as shown in FIG. 2, has two circular stress applying parts 210 and a core 208 defining a principal axis M of the PM fiber 106, see FIG. 206.

Figure 4:
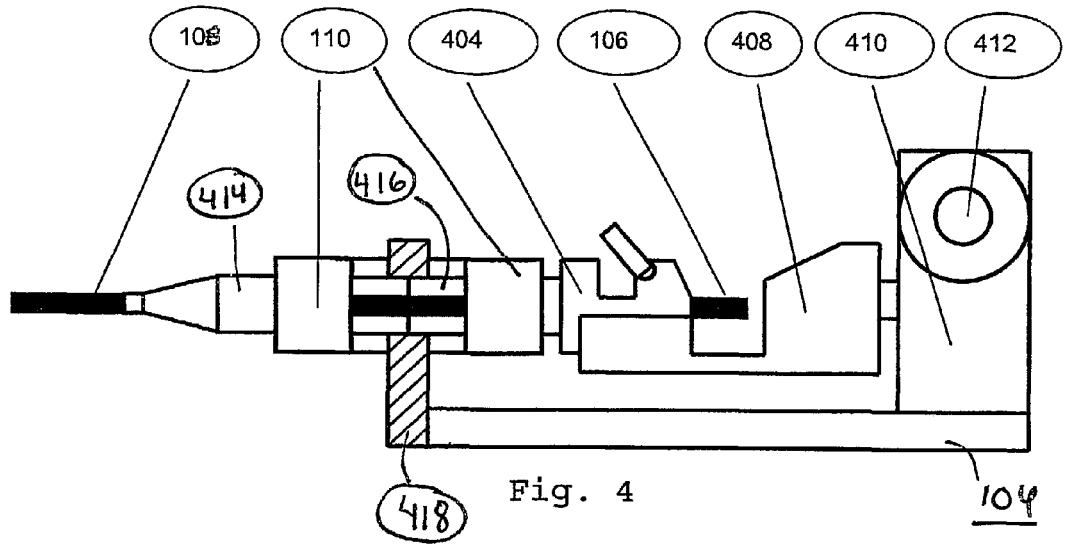
FIG. 4 is a schematic side view of a fiber rotator.

In FIG. 4, the connector 110 and the rotator 104 are shown in a larger scale. The PZ fiber 108 has at its second end, distant of the laser, a first fiber holder 414 mechanically protecting the end. The first fiber holder 414 is attached to one end of the connector 110. A second fiber holder 416, at the end of PM fiber 106 located in the connector, is attached to the other end of the connector 110. The connector 110 is attached to the rotator 104, see FIG. 4, by an arm 418 on the rotator 104. The rotator 104 comprises a rotary bare fiber adapter 404, an adapter fixture 408, a high ratio reduction gearbox 410, and a step motor 412. The PM fiber 106 is connected to the bare fiber adapter 404. To produce the rotation the step motor 412 is used. The adapter fixture 408 is connected to the gearbox 410, which transfers the motion to the fiber adapter 404. The rotator 104 is arranged to rotate the PM fiber 106 e.g. in a definite rotation direction R, indicated by the arrow see FIG. 1, a full turn, i.e. 360°, with an accuracy of 0.1° by means of the step motor 412 and the gearbox 410 giving e.g. a reduction ratio of 1:60.

The operation of the device 100 is achieved by having light from the laser diode 102 be fed to the first end facet of the PZ fiber 108 and the light propagate through the PZ fiber 108. In order to ensure a maximum output of optical power at the other end of the PZ fiber 108, the principal axis Z of the PZ fiber 108 should be aligned with the polarization axis of the laser diode 102. For this azimuthal alignment either an active or passive alignment method may be used as e.g. disclosed by S. Carrara in "Birefringent-fiber Splice Alignment", SPIE Fiber Optical Sensors IV, Vol. 1267, pp. 24–28, 1990. At the other, second end of the PZ fiber 108 at point A, see FIG. 1, a typical output of optical power can be 1 mW and the extinction ratio can be $\eta_A$=40 dB.

The azimuthal or angular offset between the principal axes Z and M of the PZ fiber 108 and the PM fiber 106, respectively, is denoted by θ, see FIG. 3. Thus, by controlling the angle θ, the extinction ratio of light in the PM fiber 106 at point B can be continuously varied, see FIG. 1. The ER can be typically varied in the range of 0.5–40.0 dB with an accuracy of about 0.2 dB. The relation between the extinction ratio $\eta_B$ and the angle θ is given by the following equation:

$$\eta_B = 10 \log \{(1+\gamma \cos 2\theta)/(1-\gamma \cos 2\theta)\} \quad (1)$$

where $$\gamma = (1-2\alpha_{PZ})(1-2\alpha_{PM}) \quad (2)$$

and $\alpha_{PZ}$, $\alpha_{PM}$ are the cross-coupling coefficients of the PZ fiber 108 and the PM fiber 106, respectively. The cross-coupling coefficient for a fiber is proportional to the length of the fiber. Due to the finite lengths of the fibers and the azimuthal offset θ, the low limit of the extinction ratio at the point B is about 0.5 dB.

If a short piece of the PM fiber 108, e.g. less than two meters, is used $\alpha_{PM}$ is negligible. The equation (1) can then be reduced to:

$$\eta_B = 10 \log \{(1+\rho_A \cos 2\theta)/(1-\rho_A \cos 2\theta)\} \quad (3)$$

where $$\rho_A = (10^{|\eta_A|/10} - 1)/(10^{|\eta_A|/10} + 1) \quad (4)$$

and $\eta_A$ is the ER at the output end of the PZ fiber, i.e. at point A.

The device 100 can be assembled in the following way. First, the laser diode 102 is coupled to the first end of the PZ fiber 108, as described above. Secondly, the second end of the PZ fiber is connected to the connector 110. The connector 110 is then connected to the PM fiber 106 so that the end facets of the two optical fibers 106, 108 meet, as described above.

When the device 100 described above is operated by energizing the light source 102 polarized light of desired extinction ratios can be obtained at point B, at the output, far end of the PM fiber 106 by rotating the meeting end facets of the PZ fiber 108 and the PM fiber 106 in relation to each other to different angular positions. A polarization meter, not shown, can be connected to point A for measuring the extinction ratio at this place, at the output end of the PZ fiber 108. The polarization meter can also be connected to point B for measuring the extinction ratio at the output end of the PM fiber 106. When varying the angular offset and measuring the resulting extinction ratio a diagram of the extinction ratio as a function of the angular offset of the principal axes M of the PZ and PM fibers can be obtained, the function having a general shape similar to that of the functions having graphs plotted in the diagram of FIG. 6, see in particular the graph drawn for injected light having an ER of 40 dB, as will be described hereinafter. Such functions can be measured for PM fibers of different types and thus depict the degradation of extinction ratio characteristic of each PM fiber type.

Figure 5:
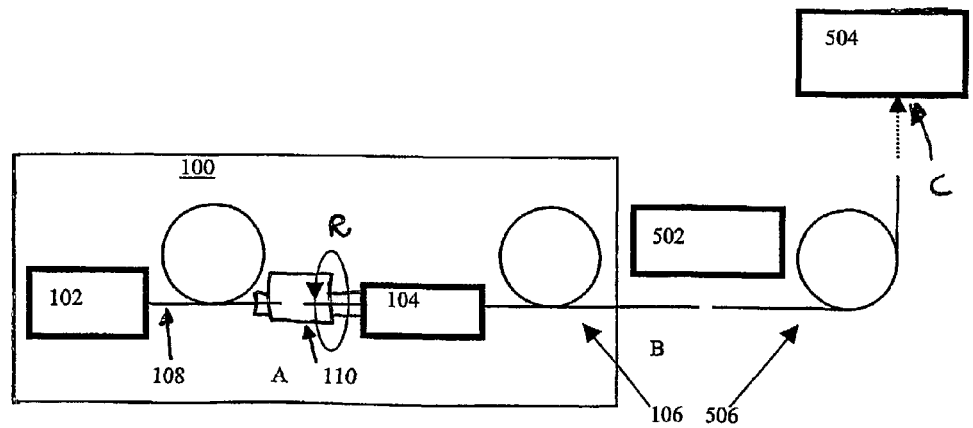
FIG. 5 is a schematic view of a typical set up used for splicing of PM fibers in the field.

In FIG. 5, a setup for splicing two PM fibers using the device 100 to obtain an accurate alignment is shown. The far, second end facet of the PM fiber 106, FIG. 1, in the device 100 is coupled to or meets a first end facet of a second PM fiber 506, the second, far end region of the first PM fiber and the first, near end region of the second PM fiber 506 being held by the clamps of a PM fiber splicer 502 so that the end surfaces are located close to each other. In the splicer 502, the adjacent end regions and thereby the end surfaces can be rotated in relation to each other about the common longitudinal axis of the aligned end regions. At the opposite, second end the second PM fiber 506 is connected to a polarization meter 504, the polarization meter 504 being for example a Santac PEM-300 unit having measurement ranges of 30+0.1 dB and 40+0.3 dB.

Figure 6:
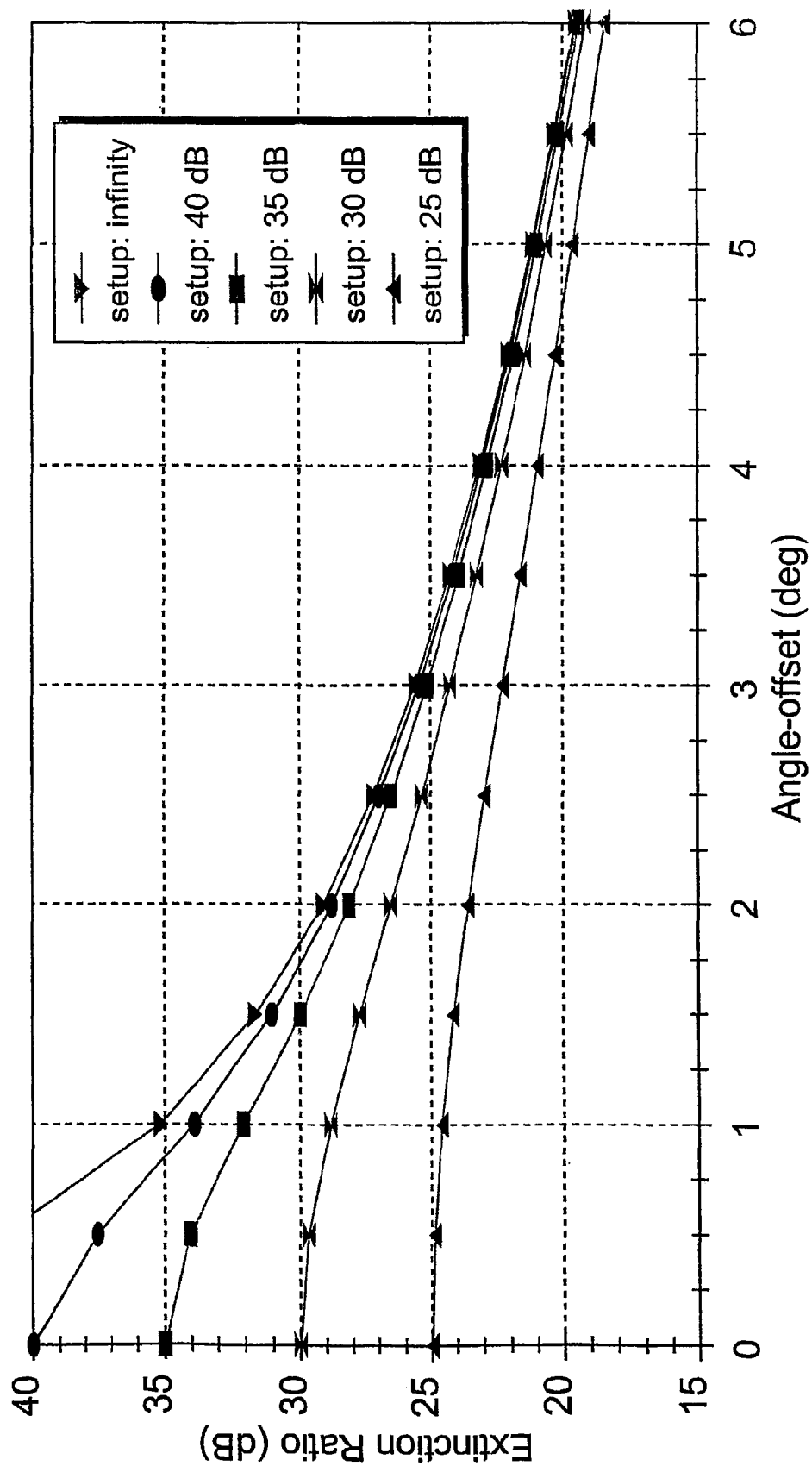
FIG. 6 is a plot of the measured ER of light having passed a splice of two PM fibers for different values of the ER of light injected into the PM fibers as a function of the angular offset between the principal axes of the two PM fibers.

A diagram as shown in FIG. 6 can then be measured when varying both the angular offset of the first and second PM fibers 106, 508 and the angular offset of the PZ fiber 108 and the first PM fibers 106 in, the connector 110. The diagram shows the measured ER, at point C, i.e. at the far, second end of second PM fiber 506, as a function of the angular offset between the principal axes of the two PM fibers as set in the PM fiber splicer for different values of the ER of incoming light which is to propagate through the PM fibers. The ER of light incoming to the two PM fibers is set by operating the device 100 to provide at point B, at the output end of the first PM fiber 106, light of a desired ER value. Furthermore, it is assumed that the second PM fiber 506 is not too long. Such diagrams can be measured for splices of all combinations of first and second PM fibers 106, 506, such as for a splice of two Panda fibers.

The diagram, shown in FIG. 6 can be initially measured for two PM fibers and then used in splicing two other PM fibers of the same types. Then the user can intentionally set the ER of light as described above by operating the device 100. As is obvious from the diagram of FIG. 6, it should be set at the highest possible value in order to achieve a high accuracy alignment. However, the sensitivity of the polarization meter 504 of is often rather low for high ER-values and thus it may be advantageous to adjust the device 100 to provide light having a lower ER than the highest possible one. Then the end regions of the two PM fibers 106, 506 are rotated in relation to each other in the PM fiber splicer 502, the ER of light at the output end of the second PM fiber 506 is measured by the meter 504 during the rotation and the rotation of the splicer is stopped when the measured ER has a maximum.

The device 100 can inversely be used to determine the quality of angular alignment of a splice made by a splicer 502, using the setup in FIG. 5 and the diagram shown in FIG. 6. Then the ER of incoming light at point B is firstly set to a desired value by appropriately operating the rotator 104 of the device 100. For example, the light provided at point A can be intentionally set to have an ER of 35 dB. The light provided at point A passes through the first PM fiber 106 and continues to the second PM fiber 506, to point B. Thereafter, the light continues to the point C and the polarization meter 504 that can measure the ER of the propagated light which in the example would have a value of 28.5 dB, see FIG. 6. From the diagram of FIG. 6 it is found that, in the example, angular offset between the principal axes of the two PM fibers 106 and 506 is about 2°. In addition, the ER of the light incoming to the splice should not be set to be too high owing to the low sensitivity of the polarization meter 504 for high ERs. The most accurate value obtained from the measurement will thus be obtained for incoming light having a reasonably high but not extremely high ER.

Furthermore, the same system can also be used for setting an angular offset with a high accuracy between the principal axes of two PM fibers. In this case, a reasonably high ER value of e.g. around 30–35 dB of light propagating at point B can be obtained by setting the device 100 appropriately. Then, the PM fibers 106, 506 are rotated in relation to each other by the splicer 502, and the ER of light at point C is simultaneously measured by the polarization meter 504. At zero angle offset the measured ER of light at point C will be almost the same as that of light entering the first PM fiber 106. From the corresponding curve in FIG. 6 the ER of light at the output end of the two fibers for a given angle offset can be found. The rotation can be stopped at the angle when this value is measured. This technique may be used for various applications, e.g. for making a depolarizer.

For different values of the ER of light injected to the two PM fibers 106, 506 different sensitivities of the measured ER and thereby of the corresponding angular offset are obtained, in particular for small angular offsets between the PM fibers, e.g. <1°, as is obvious from FIG. 6. This figure shows that the higher the ER of the light provided to the two PM fibers, the higher the sensitivity of the measured ER to the angular offset will be. In other words, with a relatively low ER of the experimental setup, a very high accuracy of the measured ER is required in order to achieve high accuracy of the angular alignment. For example, if the ER of experimental setup is 25 dB, in order to achieve a perfect alignment of the two fibers 106, 506 with the angular offsets of 1° and 0.1° with alignment accuracy of 0.1°, the accuracy of the ER measurement has to be about 0.1 dB and 0.01 dB, respectively. Due to primarily technical reasons, achieving a high accuracy of the ER measurement is at present still a difficult and/or expensive task. Therefore, it is desirable to select a high ER value of the experimental setup, e.g. 30–40 dB, for performing high accuracy of the angular alignment. This can be easily obtained when using the present device 100. However, if a too high ER is set, the sensitivity of the polarization meter will also be lower so it may not be possible to use light having the highest possible ER to be provided to the PM fibers 106, 506 for the measurement.

Furthermore, the system shown in FIG. 5 can be used for quality control of the PM fiber splicer 502. In the splicer 502, the angular alignment can be done by a unique passive alignment method, the so-called polarization observation by lens-effect-tracing (POL). POL is described in W. Zheng, "Automatic Fusion-Splicing of Polarization Maintaining Fibers", J. Lightwave Technol., Vol. 15, No. 1, pp. 125–134, January 1997, Swedish patent application 930522-1, filed 17 Feb. 1993, and U.S. Pat. No. 5,572,313. Using the POL method and image processing techniques and special algorithms, the angular offset of the PM fibers 106, 506 can thus be found by a different method. The accuracy of the angular alignment depends mainly on the adjustment of the optical and imaging systems, i.e. the settings of focus/defocus in the optical lens system and the illumination of the optical fibers in terms of the digital imaging system, and on the tolerances of the mechanical system, which are determined by the design of rotators in the splicer 502, and on the types of the PM fibers 106, 506.

An ER estimator making a calculation according to Eq. (3) can be implemented inside the splicer 502. The estimation of the measured ER can also be based on the angular offset as determined by the POL technique and a pre-setting of the setup ER. For a selected fiber type and a given value of the setup ER, the deviation between the estimated ER and the measured ER is therefore well defined by the tolerance of the angular alignment system inside the splicer 502. A typical accuracy of the angular alignment is about 0.30°. If a large deviation between the estimated ER and the ER measured by the polarization meter 504 occurs, this usually indicates faults in the optical system, digital image system, and/or mechanical system of the fiber splicer 502. Based on this principle, a method for quality control of splicers can be established.

In a quality control procedure, a number of splices can be made for different levels of ER of the experimental setup. The estimated value of the ER for each splice is compared to the directly measured value of the ER. If the deviation of the estimated ER value from the measured ER is within a factory defined tolerance for all the levels of measured ER of the experimental setup, then the tested splicer will pass the quality control. Otherwise, the careful adjustment/calibration of the angular alignment system will be re-performed.

The invention described above may be embodied in yet other specific forms without departing from the spirit or essential characteristic thereof. Thus, the present embodiments are to be considered in all respect as illustrative and not restrictive, the scope of the invention being indicated by the appended claims rather than by the foregoing description, and all chances which come within the meaning and range of equivalency of the claims therefore intended to be embraced therein.

What is claimed is:

1. A device for providing polarized light having a selectable extinction ratio at an output of a first optical fiber, the device comprising:

a source of light;

an auxiliary fiber, each of the fibers having end facets, the auxiliary fiber being connected to the source of light and the fibers being rotatable in relation to each other; and a connector, wherein an end facet of the auxiliary fiber and an end facet of the first fiber meet in the connector in which the fiber facets are rotatable in relation to each other about the longitudinal axis of the meeting fiber end regions, a rotator connected to an end of one of the auxiliary and first fibers for rotating the end facet to an angular position different than an angular position of the end facet of the other of the auxiliary and first fibers, wherein the polarized light providing device is in use, the rotator varies the extinction ratio of the polarized light at the output of the first optical fiber by rotating one or both of the fiber end facets in relation to each other to different angular positions, and wherein said auxiliary fiber is a polarizing fiber and said first optical fiber is a polarization maintaining optical fiber.

2. A device according to claim 1, wherein the rotator comprises an adapter, which holds said end of one of the fibers that is connected to the connector, and an adapter fixture which is held by the adapter for rotating the adapter fixture and is connected to a gearbox driven by a motor.

3. A device according to claim 1, characterized in that the motor (412) is a step motor.

4. A device according to claim 1, in that the adapter is a rotary fiber adapter.

5. A device according to claim 1, in that the adapter can turn 360°.

6. A device according to claim 1, in that the connector comprises V-grooves to transversely align the ends of the two fibers.

7. A device according to claim 1, in that the source of light is a fiber pigtailed laser diode.

8. A method for assembling a device according to claim 1, comprising the steps of:
coupling the source of light to one end of the auxiliary fiber,
connecting the end facet of the other end of the auxiliary fiber to one end of a connector, and
connecting the end facet of one end of the first fiber to the other end of the connector so that the end facets of the auxiliary and first fibers meet in the connector.

9. The device of claim 1, wherein the one or both end facets are rotated when the device is in use to continuously vary the extinction ratio.

10. A method for using a polarization controller for producing polarized light having a selectable extinction ratio (ER), comprising the steps of:
injecting light from a light source into an end of an auxiliary optical fiber to allow the light to propagate to an opposite end of the auxiliary fiber, said auxiliary optical fiber being a polarizing (PZ) fiber;
coupling light at the facet of the opposite end of the auxiliary fiber into a first polarization maintaining (PM) optical fiber having an end facet located at the end facet of the auxiliary optical fiber;
varying an extinction ratio of light propagating from the auxiliary fiber to the first fiber by rotating the end facets in relation to each other about a longitudinal axis of the fiber ends to different angular positions thereby providing light of a selected extinction ratio at the facet of the opposite end of the first fiber.

11. A method according to claim 10, further comprising the additional steps of:
coupling polarized light having a selected extinction ratio (ER) and propagating in the first PM fiber into a second PM fiber by locating a first end facet of the second PM fiber at a second end facet of the first PM fiber;
measuring the ER of light at a second end facet of the second PM fiber; and
rotating the second end facet of the first PM fiber in relation to the first end facet of the second PM fiber until a maximum value of the measured extinction ratio of the propagated light is reached, whereby alignment of the principal axes of the first PM fiber with the principal axes of the second PM fiber is achieved.

12. A method according to claim 11, wherein the selected extinction ratio is selected to give a high sensitivity of the measuring performed in rotating to find the maximum value.

13. A method according to claim 10, further comprising the additional steps of:
injecting polarized light having a selected extinction ratio for propagation in two PM fibers and through a splice between them;
measuring the ER of light having propagated through the PM fibers;
comparing the measured ER to the selected ER value; and
evaluating the result of the comparison, whereby an evaluation of the quality of angular alignment of the two PM fibers in a splice made by a splicer is achieved.

14. A method according to claim 13, characterized by the step of repeating the steps in claim 13 for different selected extinction ratios.

15. A method according to claim 10, further comprising the additional steps of:
providing two PM fibers and placing them in a splicer;
splicing the PM fiber by operating the splicer;
injecting polarized light of a selected extinction ratio, ER, to propagate through the spliced fibers and through the splice;
measuring the ER of the light having propagated through the PM fibers;
comparing the measured ER to the selected ER of the injected light; and
evaluating the result of the comparison, whereby quality control of a PM fiber splicer is achieved.

16. A method according to claim 15, characterized in that the steps in claim 15 are repeated for different selected extinction ratios.

17. The method in claim 10, wherein the varying extinction ratio varies continuously.

* * * * *